Dec. 29, 1931.  W. F. VAN LOENEN  1,838,890
ELECTRICAL DEHYDRATOR
Filed Oct. 23, 1928

Inventor
William F. Van Loenen.
By Fad W Laurie
Attorney

Patented Dec. 29, 1931

1,838,890

UNITED STATES PATENT OFFICE

WILLIAM F. VAN LOENEN, OF BUENA PARK, CALIFORNIA, ASSIGNOR TO PETROLEUM RECTIFYING COMPANY OF CALIFORNIA, OF LOS ANGELES, CALIFORNIA, A CORPORATION OF CALIFORNIA

ELECTRICAL DEHYDRATOR

Application filed October 23, 1928. Serial No. 314,413.

My invention relates to the treatment of emulsions in order to separate the phases thereof, and it is a primary object of this invention to provide a novel method and apparatus for breaking an emulsion.

Petroleum, as it comes from the well, is often associated with water forming an emulsion which is usually of the water-and-oil type. Electrical treatment of such petroleum emulsions is usually effective in agglomerating the water particles into globules of sufficient size that they will settle from the petroleum by the action of gravity. Such treatment in itself is, with certain types of oils, ineffective, and it has been found that by mixing a chemical modifying agent with the emulsion prior to electrical treatment, this treatment is effective in separating the phases. Such a modifying agent may be in the form of sodium oleate, calcium oleate, magnesium oleate, ammonium hydroxide, or various other materials, the controlling feature being that the modifying agent should change the interfacial tension of the emulsion. This modifying agent may be either water soluble or oil soluble. Such agents have been heretofore mixed with the emulsion before this emulsion entered the dehydrator.

It is an object of my invention to provide a method and apparatus for treating an emulsion by mixing said emulsion with a modifying agent in an electric field.

This intimate intermixture of emulsion and treating agent I accomplish by the use of an electrode in the shape of a Venturi-tube, the emulsion being injected into the mouth thereof.

It is an object of my invention to introduce emulsion into a treating space between two electrodes in such a manner that a modifying agent is intimately mixed therewith.

It is a further object of my invention to introduce emulsion, or emulsion and a modifying agent, into a treating space between a pair of electrodes by means of a passage through one electrode.

By injecting the emulsion itself, or the emulsion and the modifying agent, into the mouth of an electrode having a throat which is relatively smaller than the mouth, this electrode being submerged in a body of liquid containing the modifying agent, I accomplish a recirculation of this modifying agent through the electrode, thus effecting large economies over previous methods of mixing an emulsion and modifying agent, inasmuch as the modifying agent is recirculated until entirely used up to perform the desired function.

It is an object of my invention to provide an apparatus for continuously recirculating a modifying agent in an electric field.

In the drawings, I have illustrated a novel apparatus for carrying out my process.

Figure 1:
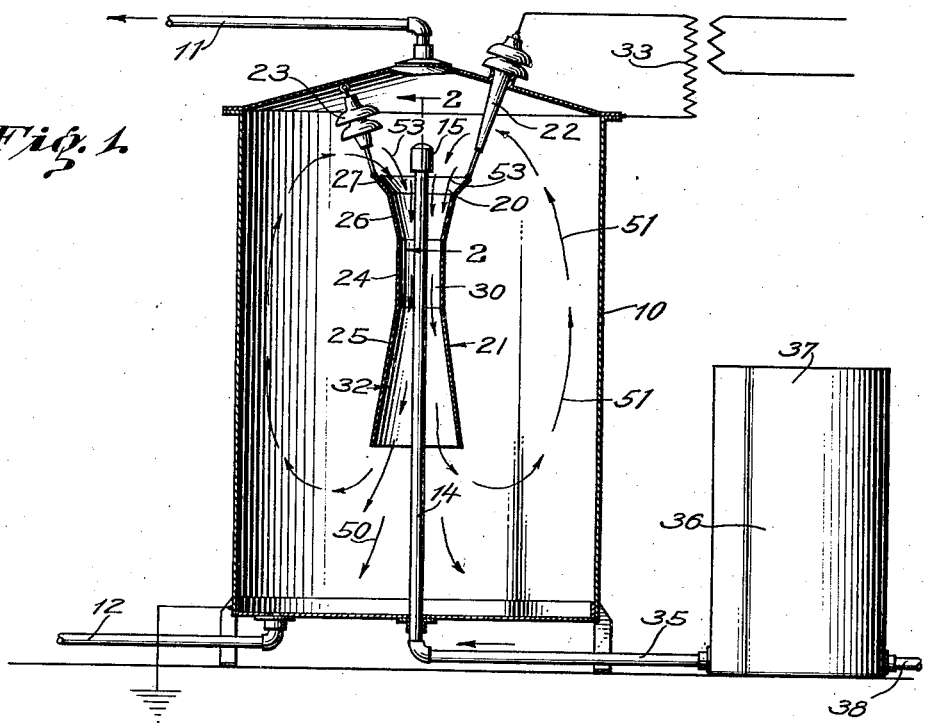
Fig. 1 is a diagrammatic sectional view illustrating the apparatus.
Figure 2:
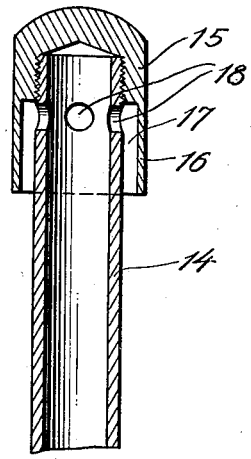
Fig. 2 is an enlarged sectional view of the upper end of the central electrode.

Referring particularly to Fig. 1, I have illustrated a tank 10 having a dry oil outlet pipe 11 and a water outlet pipe 12. Extending upward in the tank 10 is a primary or grounded electrode 14 in the form of a pipe, the upper end of which is threaded to receive a nozzle 15 having an apron 16 extending downward over the periphery of the electrode 14 a short distance. An annular discharge space 17 is formed between the apron 16 and the electrode 14, this space being in communication with the interior of the electrode by a plurality of openings 18.

The nozzle 15 is adapted to discharge into a mouth 20 of a secondary or live electrode 21 in the form of a sleeve member which is supported on insulators 22 and 23 so as to surround the primary electrode 14. I have shown this secondary electrode as composed of four sections, a center section 24 having a skirt section 25 diverging downward therefrom, and a collar section 26 diverging upward therefrom. A top section 27 is secured to the upper end of the collar section 26 and diverges upward even more than the collar section. The collar section 26 and top section 27 thus cooperate to form the mouth 20 which is in communication with a throat 30 formed between the center section 24 and the primary electrode 14. The space between the electrodes 14 and 21 comprises a treating space 32 in which an electric field is set up by a transformer 33.

Communicating with the primary electrode 14 is an inlet pipe 35 which extends to a chemical-introducing means 36. This means including a modifying agent supply means which is in the form of a shell 37 to which emulsion is supplied by a pipe 38.

The shell 37 is adapted to contain a body of modifying agent which will, when intermixed with the emulsion, change the interfacial tension of the emulsion in a manner so that the emulsion may be separated into its phases by the electric field set up in the treating space between the primary and secondary electrodes by means of the transformer 33. The particular construction of the chemical-introducing means 36 is not a part of this invention, this means being such that definite amounts of the modifying agent may be placed in the intake pipe 35 along with the emulsion passing through the pipe 38. It should be understood that it is not necessary to mix the modifying agent and the emulsion in the shell 37, the chemical-introducing means 36 being a proportioning device rather than a mixing device.

The emulsion and modifying agent are forced through the pipe 35 under pressure and are discharged into the treating space 32 formed between the primary and secondary electrodes by means of the nozzle 15, this emulsion and modifying agent being directed downward along the outer surface of the primary electrode 14 into the mouth 20, this mouth and throat defining a portion of the treating space.

Not only is the modifying agent intermixed with the emulsion to some extent when these materials pass through the nozzles, but in addition I have found that after passing through the nozzle 15 the modifying agent and emulsion are further intermixed due to being circulated through the sleeve 21, and at the same time these substances are subjected to the action of the electric field in the treating space 32. The intense field itself apparently tends to cause a further intermixture of the modifying agent and the emulsion.

This combined mixing and treating action has proved very efficient, and is more effective than a mixture of the emulsion and modifying agent before introduction into the tank 10. This is probably due to the very intimate mixture that is made possible by the nozzle 15.

As the emulsion and treating agent pass downward through the treating space 32 they are subjected to the action of the electric field from the time they enter the treating space until they are discharged from the lower end of the secondary electrode 21. This field agglomerates the water particles into masses of sufficient size so that these water particles will readily separate from the remaining dry oil, the water particles following a path indicated by the arrows 50 and dropping to the lower portion of the tank 10 whence they are removed through the pipe 12. The dry oil particles, together with the modifying agent, rise in the tank 10, as indicated by the arrows 51. This rising action is caused by the difference in specific gravities of the water and oil and also by the fact that the injector action which takes place when the emulsion is introduced into the throat 20 by the nozzle 15 causes a downward circulation through the treating space of the liquid in the tank 10, this downward flow being indicated by arrows 53. Thus, the injector action of the incoming emulsion causes the dry oil and modifying agent to be recirculated through the treating space, as indicated by the arrows 51 and 53.

This recirculation has a number of points in its favor. First, the dry oil is successively passed through the electric field, thus insuring a complete separation of the water therefrom should any minute particles of water remain in the oil passing upward around the secondary electrode. Secondly, this oil is of high dielectric strength and provides a fluid envelope inside the secondary electrode 21 which prevents short-circuiting of the electrodes. Third, any of the modifying agent capable of further action on the emulsion in being recirculated may again react with the emulsion issuing from the primary electrode 14, thus insuring the maximum action from each particle of modifying agent.

I claim as my invention:

1. A process of separating the phases of an emulsion, which comprises: introducing an emulsion into an electric field in such a way as to intimately mix said emulsion with a modifying agent capable of changing the interfacial tension of the emulsion; and recirculating the mixture of said emulsion and said modifying agent through said field.

2. In combination: a primary electrode; a secondary electrode in the shape of a Venturi-tube, said primary electrode extending through said secondary electrode; means for introducing a modifying agent into the emulsion to be treated; and discharge means for jetting said emulsion and said modifying agent into the treating space between said electrodes in a manner to intimately intermix said emulsion and said agent.

3. A combination as defined in claim 2 in which said primary electrode is hollow and in which said discharge means comprises a nozzle communicating with the interior of said primary electrode.

4. A combination as defined in claim 2 in which said primary electrode is hollow and in which said discharge means comprises a nozzle communicating with the interior of said primary electrode and directing said emulsion and said modifying agent adjacent the surface of said primary electrode.

5. A process of separating the phases of an emulsion by means of an electric treater including a pair of electrodes between which an electric field is set up, said electric field being of much greater intensity adjacent one of said electrodes than adjacent the other, which method includes the step of: introducing a stream of liquid including said emulsion and a modifying agent not intimately mixed therewith into that portion of said electric field which is of highest intensity, said modifying agent being capable of changing the interfacial tension of said emulsion.

6. In a dehydrator, the combination of: a tank; means for establishing an electric field inside said tank; nozzle means directed into said electric field; a fluid supply means for supplying the fluid to be treated; a proportioning device receiving a modifying agent capable of acting upon said fluid and receiving fluid from said supply means and supplying these materials to said nozzle means in definite proportions without intimately intermixing them, whereby an intimate mixture thereof is accomplished when discharge from said nozzle means takes place.

7. A process of treating an emulsion which includes the steps of: introducing comingled proportional parts of emulsion, and a modifying agent capable of changing the interfacial tension of said emulsion into an electric field, said emulsion and said modifying agent being not intimately mixed; and intimately intermixing said emulsion and said modifying agent in said field.

8. A process of treating an emulsion, which includes the steps of: recirculating through an electric field a modifying agent capable of modifying the interfacial tension of said emulsion; and introducing the emulsion to be treated into said field in a manner to intimately intermix with said modifying agent therein.

9. A process of treating an emulsion, which includes the steps of: recirculating through an electric field a modifying agent capable of modifying the interfacial tension of said emulsion; and introducing a stream of liquid into said field in a manner to intimately intermix with said modifying agent, said liquid comprising proportioned parts of emulsion and said modifying agent whereby the modifying agent in said electric field is continuously renewed.

10. In a treater, the combination of: a tank containing a body of liquid; a sleeve member mounted to extend in said body of liquid; nozzle means at one end of said sleeve and directed axially with respect thereto; and means for pressurally supplying proportioned and not intimately intermixed parts of emulsion and an agent capable of modifying the interfacial tension of said emulsion, said means comprising a proportioning means for controlling the relative amounts of said modifying agent and said emulsion supplied to said nozzle, the injector action of said nozzle drawing a portion of said liquid in said tank into said sleeve member whereby a mixture of said liquid, said emulsion, and said modifying agent takes place in said sleeve member.

11. A combination as defined in claim 10 in which said sleeve is in the form of a Venturi tube providing a throat and a mouth, the throat being of smaller cross-sectional area than the mouth, said nozzle means discharging into said mouth.

12. In a treater, the combination of: a tank defining a settling space containing a liquid; nozzle means directed into said tank; a supply pipe for conducting liquid to said nozzle means; emulsion supply means communicating with said nozzle means; and a proportioning means communicating with said supply pipe for supplying thereto, and in a predetermined proportion with respect to the amount of emulsion, a modifying agent capable of changing the interfacial tension of said emulsion but not intimately intermixed therewith.

In testimony whereof, I have hereunto set my hand at Los Angeles, California, this 17th day of October, 1928.

WILLIAM F. VAN LOENEN.